United States Patent
Luneau

(10) Patent No.: US 6,914,950 B1
(45) Date of Patent: Jul. 5, 2005

(54) MULTI-PROTOCOL RECEIVER

(75) Inventor: Louis Luneau, Ville St-Laurent (CA)

(73) Assignee: Lyrtech Inc., Montreal (CA)

( * ) Notice: Subject to any disclaimer, the term of this patent is extended or adjusted under 35 U.S.C. 154(b) by 721 days.

(21) Appl. No.: 09/629,892

(22) Filed: Jul. 31, 2000

(51) Int. Cl.[7] .............................. H04B 7/10; H04B 1/10
(52) U.S. Cl. ........................ 375/347; 375/349; 375/350; 455/132
(58) Field of Search ............................ 375/240, 7, 241, 375/316, 324, 325, 326, 343, 347, 350, 136, 147, 148, 149, 150, 152, 144, 260, 267, 349; 455/132, 500

(56) References Cited

U.S. PATENT DOCUMENTS

| | | | |
|---|---|---|---|
| 4,672,100 A | | 6/1987 | Schönbächler et al. |
| 4,686,686 A | | 8/1987 | Nakayama et al. |
| 4,805,191 A | | 2/1989 | Burch et al. |
| 4,881,059 A | | 11/1989 | Saltzberg |
| 4,941,155 A | | 7/1990 | Chuang et al. |
| 5,020,135 A | | 5/1991 | Kasparian et al. |
| 5,182,749 A | | 1/1993 | Kazecki et al. |
| 5,280,636 A | | 1/1994 | Kelley et al. |
| 5,297,192 A | | 3/1994 | Gerszberg |
| 5,428,667 A | | 6/1995 | Easterling et al. |
| 5,432,818 A | | 7/1995 | Lou |
| 5,471,661 A | | 11/1995 | Atkinson |
| 5,572,213 A | * | 11/1996 | Noneman et al. ............. 342/13 |
| 5,581,579 A | | 12/1996 | Lin et al. |
| 5,602,876 A | * | 2/1997 | Noneman et al. ........... 375/317 |
| 5,633,895 A | | 5/1997 | Powell, II et al. |
| 5,790,958 A | | 8/1998 | McCoy et al. |
| 5,854,813 A | * | 12/1998 | Rottinghaus et al. ....... 375/308 |
| 5,854,978 A | | 12/1998 | Heidari |
| 5,862,475 A | | 1/1999 | Zicker et al. |
| 5,878,339 A | | 3/1999 | Zicker et al. |
| 5,887,254 A | | 3/1999 | Halonen |
| 5,890,068 A | | 3/1999 | Fattouche et al. |
| 5,913,161 A | | 6/1999 | Ozulkulu et al. |
| 5,923,287 A | | 7/1999 | Lennen |
| 5,926,479 A | | 7/1999 | Baran |
| 5,926,756 A | | 7/1999 | Piosenka et al. |
| 5,930,698 A | | 7/1999 | Bertacchi |
| 5,930,704 A | | 7/1999 | Kay |
| 5,937,338 A | | 8/1999 | Tomita |
| 5,940,752 A | | 8/1999 | Henrick |
| 5,953,651 A | | 9/1999 | Lu et al. |
| 5,963,603 A | | 10/1999 | Li et al. |
| 5,974,309 A | | 10/1999 | Foti |
| 5,982,832 A | | 11/1999 | Ko |
| 5,991,346 A | | 11/1999 | Lu |
| 5,995,515 A | | 11/1999 | Suzuki |
| 5,995,829 A | | 11/1999 | Broderick |
| 6,002,728 A | | 12/1999 | Blois et al. |
| 6,002,924 A | | 12/1999 | Takano |
| 6,006,105 A | | 12/1999 | Rostoker et al. |
| 6,009,130 A | * | 12/1999 | Lurey et al. ................. 375/347 |
| 6,047,191 A | | 4/2000 | Desgagné |
| 6,052,600 A | | 4/2000 | Fette et al. |
| 6,072,994 A | * | 6/2000 | Phillips et al. ................ 455/84 |
| 6,151,354 A | * | 11/2000 | Abbey ......................... 375/211 |
| 6,167,099 A | * | 12/2000 | Rader et al. ................. 375/347 |
| 6,205,133 B1 | * | 3/2001 | Bexten ........................ 370/343 |
| 6,448,921 B1 | * | 9/2002 | Tsui et al. ..................... 342/13 |
| 6,483,817 B1 | * | 11/2002 | Antonio et al. ............. 370/328 |

FOREIGN PATENT DOCUMENTS

WO    WO 97 30523    8/1997

OTHER PUBLICATIONS

The Software Radio Concept by Enrico Buracchini, IEEE Communications, Sep. 2000, vol. 38 No. 9, pp 138–143.

* cited by examiner

Primary Examiner—Temesghen Ghebretinsae
Assistant Examiner—Sam K. Ahn
(74) Attorney, Agent, or Firm—Ogilvy Renault LLP

(57) ABSTRACT

A multi-protocol receiver system for receiving wireless communications. The system comprises programmable stages for controlling each steps of the demodulation of at least one broadband signal to provide the I and Q signals of at least one specific frequency narrow band for further processing. The receiver can be used in a software defined radio system.

18 Claims, 4 Drawing Sheets

MULTI-PROTOCOL RECEIVER

FIELD OF THE INVENTION

The present invention relates to wireless receivers. More precisely, this invention describes a multi-protocol receiver for intercepting, monitoring and/or recording conversation over a cellular network.

BACKGROUND OF THE INVENTION

With the increasing complexity of telecommunication means, criminals are finding new ways to escape from the surveillance of the police or other law enforcement agencies. This can, potentially, become a threat to society. More specifically this problem is increasing with the global development of mobile telecommunication means.

The term mobile telecommunication can include technologies ranging from cordless telephones, digital cellular mobile radios, and personal communication systems that are evolving to wireless data and networks.

A mobile telecommunication system is usually composed of a base station 13, connected to the public telephone network via a Mobile Telephone Switching Office (MTSO), and of a group of mobile users 14. The base station 13 covers a certain geographical area.

A communication between a mobile user and a standard public network user is thus performed using the base station 13. Each communication link uses a particular frequency band known as a voice channel. The uplink transmission refers to the signal sent by a mobile station 14 to a base station 13, while the downlink transmission refers to a signal sent by the base station 13 to a mobile station 14. Therefore, a single conversation requires two voice channels. The monitoring of a particular conversation implicitly requires the monitoring of the two voice channels. One prior technique for monitoring cellular telephone conversations involves a simple tuner that scans voice channels. This technique is not efficient when the number of communications to handle is high and when the frequency of the voice channel changes often.

A second technique consists of monitoring the two voice channels and the traffic channels of the communication system in order to handle the handover (i.e. when a user, by a physical displacement, changes base stations). Thus it is possible to track a user through a cellular network.

Focusing more precisely on wide band receivers, the prior art comprises one type of system which is composed of a group of front end radio frequency demodulation stages which include parallel narrow-band receivers. Usually, the Radio Frequency (RF) band coverage provided by these narrow-band receivers is of adjacent frequency. Each RF stage has its own local oscillator frequency and Intermediate Frequency (IF) stages. Such a system is very costly because only one RF stage is working at a time. The inactive RF stages are superfluous during operations.

In another configuration (described in patent U.S. Pat. No. 6,002,924 col 1, line 57 to 67), the choice of the first IF and the first local oscillator, the second IF and the second local oscillator allow the user to access a broad band radio receiver. However, because of inter-modulation and image frequency response, certain frequencies are not available. This element is unacceptable for the purpose of this use.

In U.S. Pat. No. 6,002,924, Takano succeeds to create a broadband radio receiver with a continuous spectrum. However, there is still a gap to fill in order to complete the task of intercepting users because for each voice interception, two receivers are needed; this is too costly therefore this is not acceptable. Furthermore, the processing of the RF signal is completed using an analog processing. This analog receiver architecture has the serious drawback to use multiple mixers and filters. Furthermore, the analog receiver architecture is subject to temperature drift and mismatch from part variations.

SUMMARY OF THE INVENTION

It is an object of the present invention to provide an efficient architecture that will avoid one or more of the shortcomings of the conventional technology.

It is an object of the present invention to provide a scanner for mobile telecommunications.

It is an object of the present invention to provide a scanner for mobile communications that will be able to handle simultaneously a consequent number of conversations coming from any part of the available frequency bands.

Another object of the present invention is to provide a scanner that will be able to cope with various frequency bands.

Another object of the present invention is to provide a scanner that will be able to cope with various telecommunications protocols.

Yet another object of the present invention is to provide a receiver that can be software controlled.

Yet another object of the present invention is to provide a scanner in which there is a possibility to achieve a protocol upgrade of the system.

Yet another object of the present invention is to provide a scanner in which there is a possibility to achieve a frequency band update of the system.

Yet another object of the invention is to provide a scanner in which there is a possibility to add other users to the system.

According to one aspect of the invention, there is provided a method for scanning a group of mobile telecommunication users. The method comprising the steps of: collecting a wideband frequency signal using an antenna, performing a first demodulation of the wideband frequency signal to obtain a demodulated wide band signal; digitizing the demodulated signal to obtain a digital demodulated signal; routing the digital demodulated signal to a device which performs on the digital demodulated signal a narrow-band extraction, performing the narrow band extraction on the digital demodulated signal and generating an in-phase component and a quadrature component for a selected voice channel.

In accordance with another aspect of the present invention, there is provided an apparatus for monitoring the communications of a group of mobile users. The apparatus first comprises at least one demodulation unit, also called RF receiver unit, a number of demodulation units depending on a number of different frequency bands that are targeted to be monitored. Each demodulation unit is composed of two separate circuits that are each dedicated to the scanning of a downlink transmission and an uplink transmission. The apparatus also comprises an Analog to Digital Converter (ADC) whose goal is to convert the analog signal into a digital signal. The apparatus also comprises a Central Processing Unit (CPU), which routes the signal through the Digital Down Converters (DDC) and commands the demodulation unit. The narrow band extraction is performed at this stage. Finite Input Response (FIR) filtering is also performed. The output signal can be decoded by a processing unit in accordance with the protocol that was used to encode the information.

According to another aspect of the invention, there is provided a method for tracking a mobile. The method comprising the steps of: requesting from a user at least one wireless conversation to monitor, receiving at least one control channel signals using a control channel receiver, processing said received control channel signals according to at least one of said wireless conversations to monitor to provide at least one voice channel, each one of said voice channels corresponding to one wireless conversations to monitor, storing in a memory a relation between one of said wireless conversations to monitor and one of said voice corresponding voice channel, setting, using pre-recorded data on the type of wireless telecommunication protocol and frequency band coming from a non-volatile memory, the parameters of the filters, the frequency of the down converters, and the paths in the switch in order to track said users.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

Figure 1:
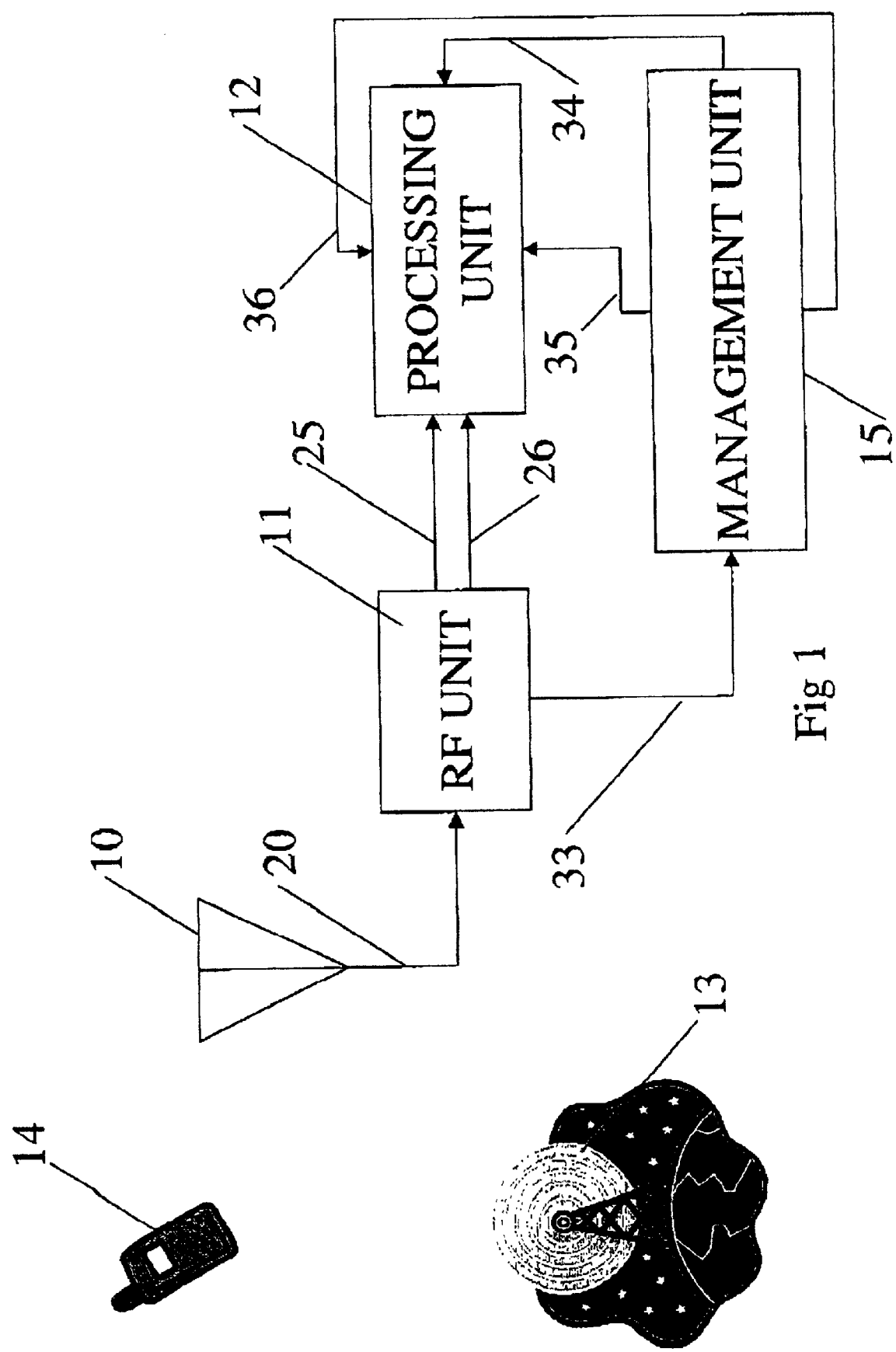
FIG. 1 shows an overview of a base station and mobile unit wideband scanner.

While the present invention may be provided in various embodiments, there is shown in the drawings and described in the following text a specific preferred embodiment, with the understanding that the present description is only one embodiment and is not limiting of scope of the invention.

FIG. 1 presents one embodiment of the invention. The system in the preferred embodiment is a scanner, that is a device which monitors transmission from either a base station 13 or a mobile 14. Such a device is used typically by police for lawful intercept of cellular telecommunications. An antenna 10 collects the radio signals coming from the base unit 13 and the mobile unit 14. A demodulation unit 11 handles radio signals. The demodulation unit 11 provides the IF signal to the processing unit 12. The RF unit 11 imposes limitations on this signal in order to prevent it from being harmful for the following stages. The processing unit 12 is able to select parts of the wideband signal coming from either a base unit 13 or a mobile unit 14. A management unit 15 controls the processing unit 12 and get signals from the RF unit 11. In a preferred embodiment, the management unit 15 comprises a computer with a data acquisition hardware and a software.

Figure 2:
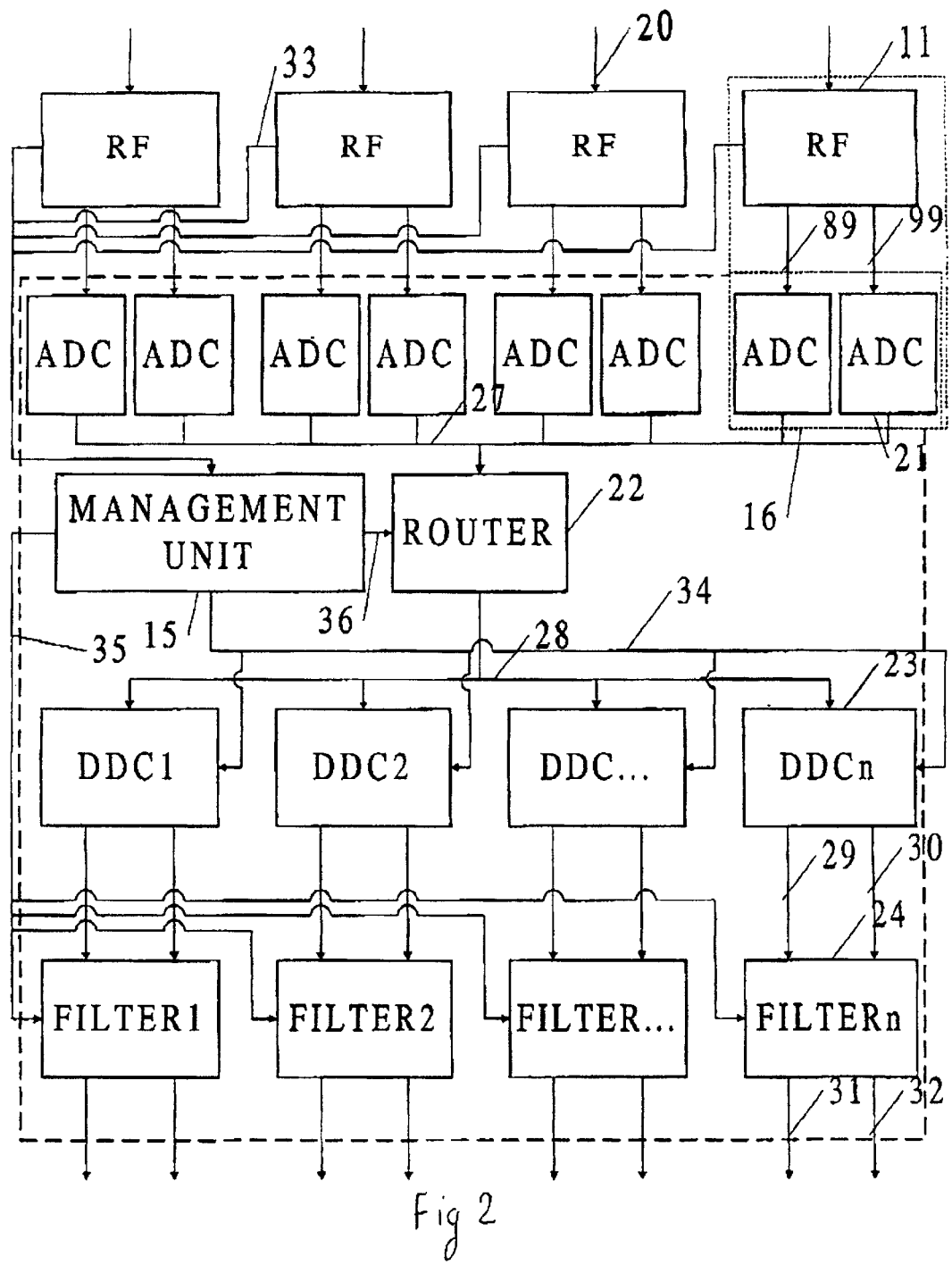
FIG. 2 shows the RF stage and the processing unit, the RF stage comprises four RF units; the system depicted there can process four different full duplex conversations coming from four different frequency bands.

FIG. 2 shows the different parts of the architecture of the system in the preferred embodiment.

Each unit 16, composed of a RF stage 11 and an ADC stage 21, is capable to collect the base station signal and the mobile station signal of a certain frequency band. In the preferred embodiment, the scanner is able to tap simultaneously four different frequency bands because the device is composed of four units 16. Each RF unit 11 sends a power information signal 33 to the management unit 15. The ADC stage 21 is connected to a router 22 that is, in the preferred embodiment, a Field Programmable Gate Array (FPGA). The router 22 is controlled by the management unit 15 using signal 36. Next to the router unit 22, a group of DDC units 23 are connected via a bus 28. Finally a filter stage 24 is connected to each DDC unit 23 using signals 29 and 30. This filter stage 24 is controlled by the management unit 15 using signal 35. The filter stage 24 provide signals 31 and 32 to the demodulation units. The demodulation units are not shown in FIG. 2, and may comprise standard demodulation circuits for extracting information from the regular bandwidth signal according to the wireless transmission protocol of each regular bandwidth signal, e.g. TDMA, AMPS, GSM.

The antenna 10 receives the radio signal. Typically, the signal power ranges between −110 dBm and −14 dBm.

In the case of a cellular system, the frequency band is located between 824 MHz and 894 MHz. The uplink band is located between 824 MHz and 849 MHz, while the frequency band located between 869 MHz and 894 MHz is dedicated for downlink communications.

In the case of a Personal Communication Service (PCS) system, the frequency band is located between 1850 MHz and 1990 MHz. The uplink frequency band is located between 1850 MHz and 1910 MHz, while the downlink frequency band ranges from 1930 MHz and 1990 MHz. The downlink frequency band is shared into two frequency bands: the low downlink frequency band which is located between 1930 MHz and 1960 MHz, and the high downlink frequency band which is located between 1960 MHz and 1990 MHz. The uplink frequency band is shared into two frequency bands: the low uplink frequency band which is located between 1850 MHz and 1880 MHz, and the high uplink frequency band which is located between 1880 MHz and 1910 MHz.

Figure 3:
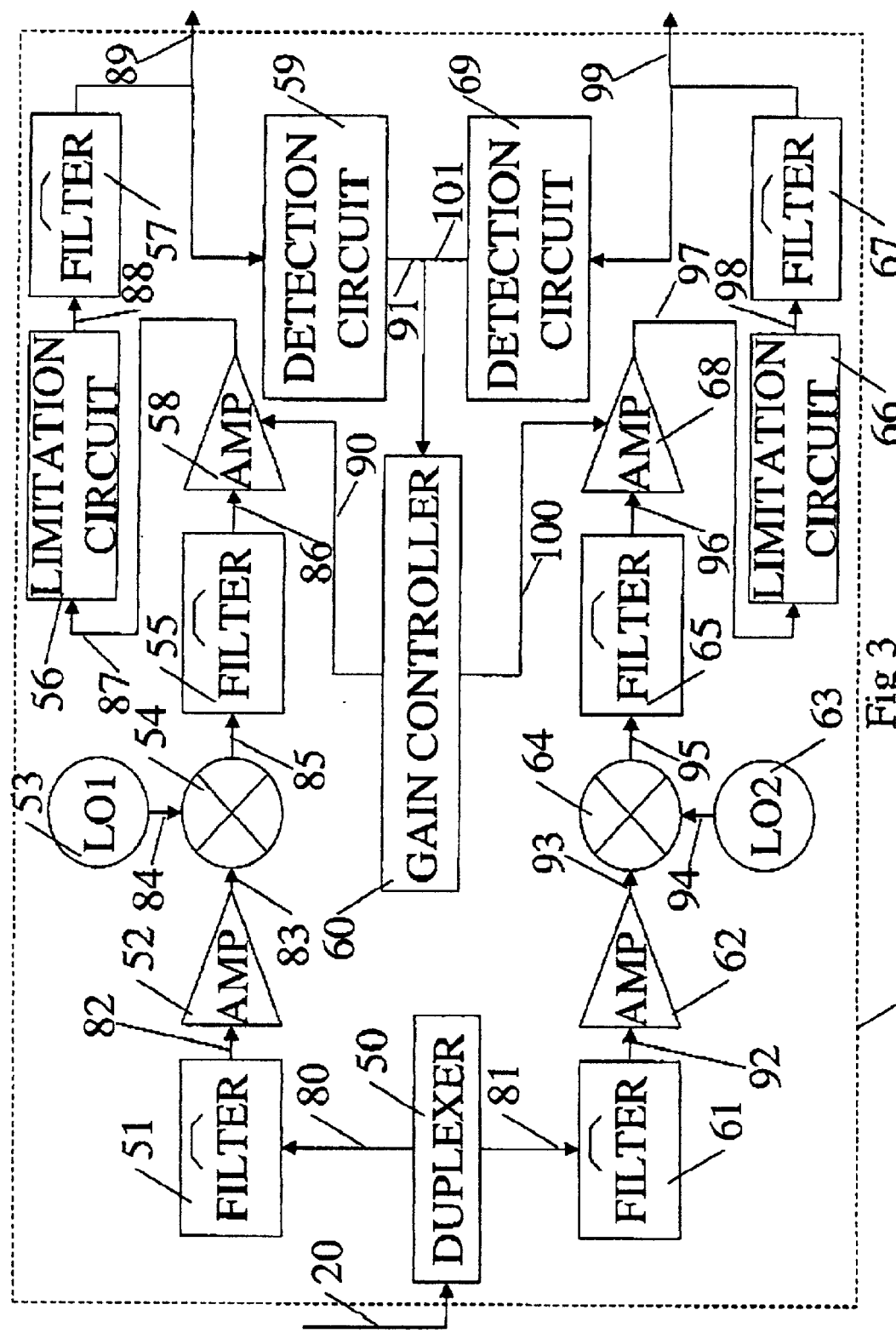
FIG. 3 shows the RF unit that can process a full duplex wireless conversation.

The RF unit 11, described in FIG. 3, filters and amplifies the incoming signal 20, collected by the antenna 10. More precisely, a duplexer divides the signal 20 into two different signals 80 and 81, corresponding to the downlink and the uplink transmission. Thus, these separated signals 80 and 81 can be sent to two different parts: a mobile RF stage (which comprises elements: 61, 62, 63, 64, 65, 66, 67, 68, 69) and a base RF stage (which comprises elements: 51, 52, 53, 54, 55, 56, 57, 58, 59). These two different stages allow the scanning of either the radio signals coming from the mobile unit 14 or the radio signals coming from the base unit 13.

In both cases, the signal collected by the antenna 10 is filtered by filter. In the case of a base station signal, the filter is filter 51 which will only select frequency signals located between 869 and 894 MHz in the case of a cellular system. In the case of a PCS system, filter 51 only selects frequency signals located between either 1930 MHz and 1960 MHz (low part of the base station signal) or 1960 MHz and 1990 MHz (high part of the base station signal).

In the case of a mobile station signal, the filter 61 only selects frequency signals located between 824 MHz and 849 MHz in the case of a cellular system. In the case of a PCS system, filter 61 only selects frequency signals located between either 1850 MHz and 1880 MHz (low part of the mobile signal) or 1880 MHz and 1910 MHz (high part of the mobile signal).

In the case of a base station signal, a RF amplifier 52 amplifies signal 82 coming from the frequency filter 51. In the case of a mobile signal, the RF amplifier 62 amplifies signal 92 coming from the frequency filter 61.

In the preferred embodiment, and in the case of a cellular system, the local oscillator 53 comprises an ultra low noise TCXO local oscillator followed with a signal amplifier, a frequency multiplier, by a factor of 2, a signal amplifier, frequency multiplier, by a factor of 2, a signal amplifier, a frequency multiplier, by a factor of 2, an amplifier, an harmonic filter and an amplifier. The harmonic filter is a bandpass filter that will reject non desired harmonics.

In the case of the cellular system, the frequency of the ultra low noise TCXO local oscillator is 117 MHz. Thus, the oscillator 53 generates a signal 84 with a frequency of 936 MHz. In the case of the cellular system, the local oscillator 53 calibrated at 936 MHz, is connected to a mixer 54. Such a system will translate the signal from a central frequency of 881.5 MHz down to a central frequency of 54.5 MHz, that has been chosen in order to be compatible with the central frequency of the following filter 55. The bandwidth will remain 25 MHz.

In the case of a PCS low-band base station signal, the frequency of the ultra low noise TCXO local oscillator is 118.125 MHz. The ultra low noise TCXO local oscillator is followed by a signal amplifier, a frequency multiplier, by a factor of 2, a signal amplifier, a frequency multiplier, by a factor of 2, a signal amplifier, frequency multiplier, by a factor of 2, a signal amplifier, a frequency multiplier, by a factor of 2, an amplifier, an harmonic filter and an amplifier. Thus, the oscillator 53 generates a signal 84 with a frequency of 1890 MHz. In the case of a PCS low-band base station signal, the local oscillator 53 calibrated at 1890 MHz is connected to a mixer 54. Such a system will translate the signal from a central frequency of 1945 MHz down to a central frequency of 55 MHz, that has been chosen in order to be compatible with the central frequency of the following filter 55. The bandwidth will remain 30 MHz.

In the case of a PCS high-band base station signal, the frequency of the ultra low noise TCXO local oscillator is 120 MHz. The ultra low noise TCXO local oscillator is followed by a signal amplifier, a frequency multiplier, by a factor of 2, a signal amplifier, a frequency multiplier, by a factor of 2, a signal amplifier, a frequency multiplier, by a factor of 2, a signal amplifier, a frequency multiplier, by a factor of 2, an amplifier, an harmonic filter and an amplifier. Thus, the oscillator 53 generates a signal 84 with a frequency of 1920 MHz. In the case of a PCS high-band base station signal, the local oscillator 53 calibrated at 1920 MHz is connected to a mixer 54. Such a system will translate the signal from a central frequency of 1975 MHz down to a central frequency of 55 MHz, that has been chosen in order to be compatible with the central frequency of the following filter 55. The bandwidth will remain 30 MHz.

A local oscillator 63, in the case of a mobile signal, is connected to a mixer 64. In the preferred embodiment, and in the case of the cellular system, the local oscillator 63 comprises an ultra low noise TCXO local oscillator followed with a signal amplifier, a frequency multiplier, by a factor of 2, a signal amplifier, a frequency multiplier, by a factor of 2, a signal amplifier, a frequency multiplier, by a factor of 2, an amplifier, an harmonic filter and an amplifier. The harmonic filter is a bandpass filter that will reject non desired harmonics.

In the case of the cellular system, the frequency of the ultra low noise TCXO local oscillator is 97.75 MHz. Thus, the oscillator 63 generates a signal 94 with a frequency of 782 MHz. In the case of a mobile cellular frequency band, the local oscillator 63 calibrated at 782 MHz is connected to a mixer 64. Such a system will translate the signal from a central frequency of 836.5 MHz down to a central frequency of 54.5 MHz, that has been chosen in order to be compatible with the central frequency of the following filter 65. The bandwidth will remain 25 MHz.

In the case of a PCS low-band mobile station signal, the frequency of the ultra low noise TCXO local oscillator is 120 MHz. The ultra low noise TCXO local oscillator is followed by a signal amplifier, a frequency multiplier, by a factor of 2, a signal amplifier, a frequency multiplier, by a factor of 2, a signal amplifier, a frequency multiplier, by a factor of 2, a signal amplifier, a frequency multiplier, by a factor of 2, an amplifier, an harmonic filter and an amplifier. Thus, the oscillator 63 generates a signal 94 with a frequency of 1920 MHz.

In the case of a PCS low-band mobile station signal, the local oscillator 63 calibrated at 1920 MHz is connected to a mixer 64. Such a system will translate the signal from a central frequency of 1865 MHz down to a central frequency of 55 MHz, that has been chosen in order to be compatible with the central frequency of the following filter 65. The bandwidth will remain 30 MHz.

In the case of a PCS high-band mobile station signal, the frequency of the ultra low noise TCXO local oscillator is 121.875 MHz. The ultra low noise TCXO local oscillator is followed by a signal amplifier, a frequency multiplier, by a factor of 2, a signal amplifier, a frequency multiplier, by a factor of 2, a signal amplifier, a frequency multiplier, by a factor of 2, a signal amplifier, a frequency multiplier, by a factor of 2, an amplifier, an harmonic filter and an amplifier. Thus, the oscillator 63 generates a signal 94 with a frequency of 1950 MHz. In the case of a PCS high-band mobile station signal, the local oscillator 63 calibrated at 1950 MHz is connected to a mixer 64. Such a system will translate the signal from a central frequency of 1895 MHz down to a central frequency of 55 MHz, that has been chosen in order to be compatible with the central frequency of the following filter 65. The bandwidth will remain 30 MHz.

In all cases, and in the preferred embodiment, the multiplication of the signals provided by the mixer is completed with a high S/N ratio.

In the case of a base cellular signal, a filter 55, with a central frequency of 54.5 MHz only selects the desirable bandwidth, i.e. 25 MHz, of the incoming signal 85. In the case of a PCS base signal, the filter 55, with a central frequency of 55 MHz, will only select the desirable bandwidth, i.e. 30 MHz, of the incoming signal 85.

In the case of a mobile cellular signal, a filter 65, with a central frequency of 54.5 MHz only selects the desirable bandwidth, i.e. 25 MHz, of the incoming signal 95

In the case of a PCS mobile signal, the filter 65, with a central frequency of 55 MHz, will only select the desirable bandwidth, i.e. 30 MHz, of the incoming signal 95.

In the case of a base signal, an IF amplifier 58 boosts the selected signal 86 after filter 55. In the case of a mobile signal, an IF amplifier 68 boosts the selected signal 96 after filter 65.

In both cases, the amplification of the signal can be chosen between 14 dB and 56 dB by a gain controller 60. The amplification is performed with a high S/N ratio. The objective of the RF stage 11 is to get an output power of 0 dBm at the end of the RF stage 11.

In the case of a base signal, amplifier 58 is connected to a limitation circuit 56 via signal 87. The limitation circuit 56, which is composed of diodes, protects the end of the RF stage 11 from voltage peaks that would be harmful to the following stages.

A filter 57 is connected to the limitation circuit 56 using signal 88. The filter 57 is composed of resistances and capacitors. The filter 57 is connected to a detection circuit 59 which converts the output signal 89 into a DC value comprised between 0 and 2.5 V, and proportionate to the output power of signal 89. The DC value is then used as a feedback reference in order to control the IF amplifiers 58 and to provide an output power signal closed to 0 dBm. The gain controller 60, that collects the feedback signal 91 comprises, in the preferred embodiment, a PIC 16C74 processor. In the preferred embodiment, the gain controller 60 adjusts the gain of amplifiers 58 and 68 each 46 msec. The gain controller 60 also comprises, in the preferred embodiment, an EEPROM which stores the relation between voltage signal and power in dBm. The output power computed by the gain controller 60 using signal 91 and 101 is transmitted to the management unit 15. In the preferred embodiment, the transmission is completed using a RS232 interface.

In the case of a mobile signal, the amplifier 68 is connected to a limitation circuit 66 via signal 97. The limitation circuit 66, which is composed of diodes, protects the end of the RF stage 11 from voltage peaks that would be harmful to the following stages.

A filter 67 is connected to the limitation circuit 66 using signal 98. The filter 67 is composed of resistances and capacitors. The filter 67 is connected to a detection circuit 69 which converts the output signal 99 into a DC value comprised between 0 and 2.5 V, and proportionate to the output power. The DC value is then used as a feedback reference in order to control the IF amplifiers 68, using the gain controller 60, and to provide an output power signal closed to 0 dBm.

Referring to FIG. 2, an ADC stage 21 follows the RF stage 11. The ADC stage 21 converts signals 89 and 99. The conversion is performed at a rate of 75 MHz, thus it more than satisfies Nyquist sampling theorem for the 25 MHz signal. The quantization is 10 bits. It is important to notice that the device used for the analog to digital conversion has a high Signal/noise (S/N) ratio in the preferred embodiment. After the conversion, the information becomes a flow of digital information. A router 22, that is, in the preferred embodiment a FPGA, will then route this flow of information through the DDC 23. The router acts as a switch which performs path selection between multiple parts. The choice of a FPGA is justified by the fact that it can be soft-configured very easily, and by the fact that it can handle very large amount of data (it has a large bandwidth). The router 22 is controlled by the management unit 15. The router 22 creates a data bus 28 that is connected to the DDC 23. Each DDC 23 is then able to collect data coming from a particular unit 16. The DDC 23 is a tuneable down converter adapted to numerical signals.

Each DDC 23 downconverts the signal 28 with a local oscillator and an in-phase and quadrature downconverter. The management unit 15 controls the DDC 23 and allows each DDC 23 to select a specific conversation.

Figure 4:
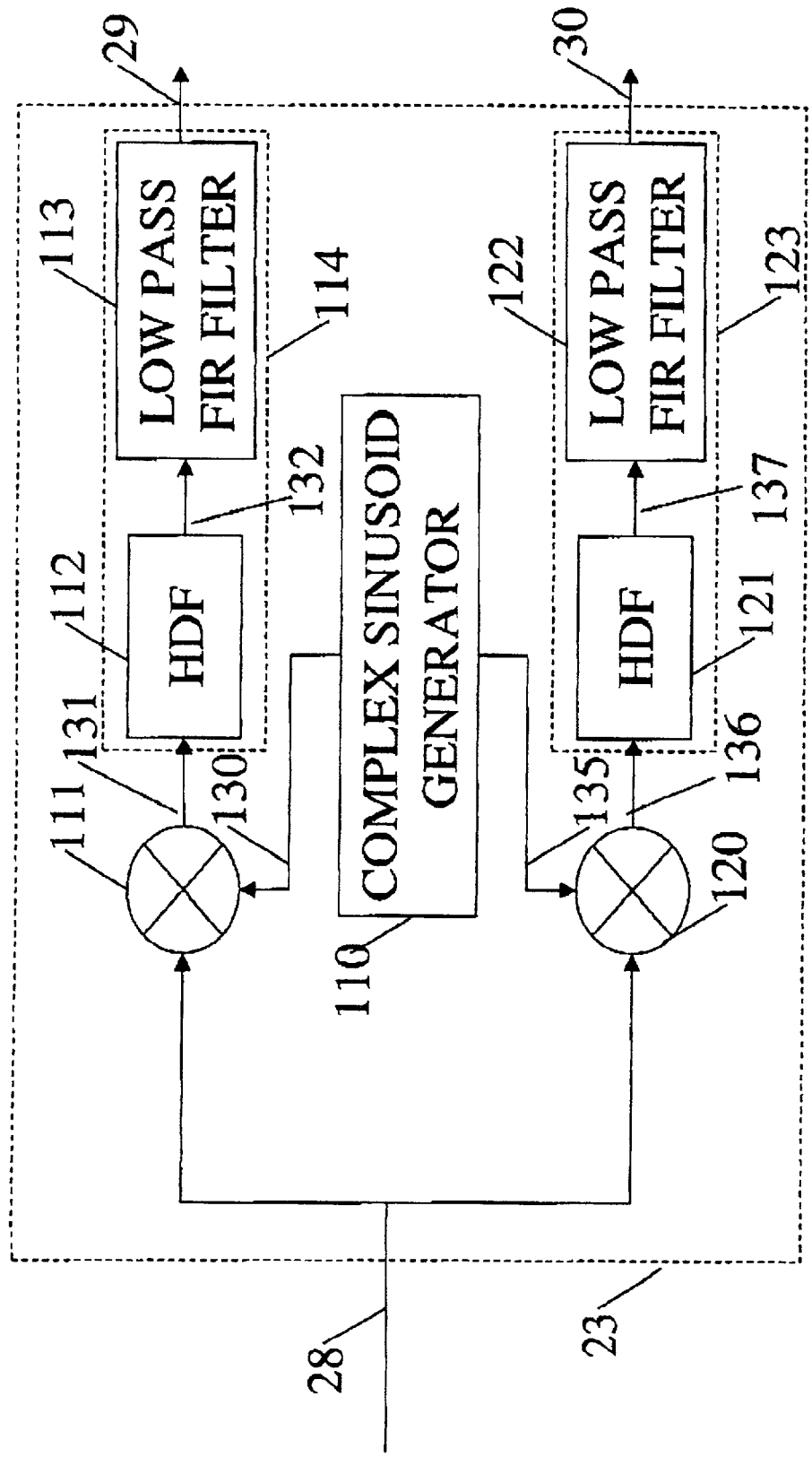
FIG. 4 shows a DDC unit and a filter stage that can process a full duplex wireless conversation.

FIG. 4 describes more precisely the operations completed by the DDC 23.

In the preferred embodiment, the DDC 23 is an Intersil HSP50016. The goal of the DDC 23 is to extract a narrow frequency band of interest from a wideband input signal, convert that band to a baseband and output it in either a quadrature or a real form. In the present invention, the goal of each DDC is to select a voice channel coming either from the base station 13 or from the mobile unit 14 via the router 22, in order to intercept it.

The narrow band extraction is performed by down converting and centering the band of interest. The DDC 23 has an input data stream of 16 bits in width and 75 MSPS in data rate. As the ADC 21 performs the conversion with a quantization of only 10 bits, the six (6) Less Significant Bit (LSB) are grounded in order to maintain a good accuracy. The conversion is done by multiplying the input data 28 with a quadrature sinusoid generated by a complex sinusoid generator 110. In order to get the in-phase component (designated as I) 29 of the quadrature sinusoid, the signal 28 is multiplied by a cosine signal 130 in the mixer 111. In order to get the quadrature component (designated as Q) 30, the signal 28 is multiplied by a sine signal 135 in the mixer 120. The frequency of the complex sinusoid generator 110 of the DDC 23 can be selected by the management unit 15 in order to select a specific voice signal.

A quadrature lowpass filter 114 is applied to the output of the mixer 111. Another quadrature lowpass filter 123 of the same type of the above is connected to the output of the mixer 120. In the preferred embodiment, filtering chain 114 consists of a cascaded High Decimation Filter (HDF) 112 and a low pass FIR filter 113. The filtering chain 123, in a preferred embodiment, consists of a cascaded HDF 121 and a low pass FIR filter 122. The combined response of the two stages filters results in a –3 dB to –102 dB shape factor. Each filtering chain (114 and 123) is controlled by the management unit 15 according to the voice channel selected. The decimation factor is 4×78 in the case of AMPS. The decimation factor is 4×77 in the case of DAMPS.

Each DDC 23 provides the quadrature signal (Q) 30 and the in-phase component (I) signal 29 of a specific voice channel to tap. The output frequency of signal I 29 and signal Q 30 is 240.384 kHz in the case of AMPS. In the case of DAMPS, the output frequency of signal I 29 and signal Q 30 is 243.506 kHz.

The signals 29 and 30 are filtered through a FIR 24. In the preferred embodiment, FIR 24 is a HSP43124SC-33 which is programmable. The FIR filter 24 is controlled by the management unit 15 which provides the coefficients for the right protocol.

In the case of AMPS and in the preferred embodiment, the algorithm of Parks-McClellan is used to compute the coefficients of the order 233 FIR 24. The algorithm of Parks-McClellan is also used to compute the coefficients of the order 233 FIR 24 in the case of DAMPS. In the case of GSM and CDMA, a similar approach is used to compute the coefficients of the FIR 24. In the preferred embodiment, the low pass frequency of the filter FIR 24 is 12.4 kHz; and the attenuation is 80 dB at 17.6 kHz in the case of AMPS and DAMPS.

The signals 31 and 32 are available for demodulation according to the protocol used for the transmission.

What is claimed is:

1. A multi-protocol receiver for receiving wireless transmissions comprising:

a plurality of RF receiver units each receiving a wireless signal and outputting a broadband IF signal;

a plurality of tunable down converter units, each able to tune over a frequency range of all of said broadband IF signal of all of said RF receiver units, and said plurality of tunable down converter units output raw I and Q signals;

a plurality of tunable filters receiving said raw I and Q signals from one of said plurality of tunable down converter units and providing filtered I and Q output signals;

a switch for coupling a selected RF receiver unit of said plurality of RF receiver units to a selected one of said plurality of tunable down converter units; and a management unit receiving a request for a specific frequency band and setting a tuning frequency of a selected one of said plurality of tunable down converter units, setting filter parameters of a selected one of said plurality of tunable filters, and setting said switch.

2. The multi-protocol receiver as claimed in claim 1, further comprising a plurality of ADC units each connected to one of said plurality of RF receiver units, wherein said switch connects a broadband digital output of said plurality of ADC units to said plurality of tunable down converter units.

3. The multi-protocol receiver as claimed in claim 2, wherein the management unit comprises:

a channel selection signal input;

a memory for storing said filter parameters for channels from said broadband IF signal of all of said RF receiver units and frequency parameters for all of said tunable down converter units and switch parameters;

an interpreter receiving said selection signal and setting said filter parameters, said tunable down converters, and said switch parameters based on data stored in said memory.

4. The multi-protocol receiver as claimed in claim 3, wherein there are at least two of said tunable down converter units in order to receive full duplex conversations, said memory for storing switch parameters provides information for allocating said at least two of said tunable down converter units to said full duplex conversations.

5. The multi-protocol receiver as claimed in claim 2, wherein there are at least two of said tunable down converter units in order to receive full duplex conversations.

6. The multi-protocol receiver as claimed in claim 2, wherein a tunable filter of said plurality of tunable filters is an N tap FIR filter.

7. The multi-protocol receiver as claimed in claim 2, wherein said switch is an FPGA.

8. The multi-protocol receiver as claimed in claim 2, wherein each of said ADC units performs the conversion at a rate of at least 50 MHz.

9. The multi-protocol receiver as claimed in claim 1, wherein the management unit comprises:

a channel selection signal input;

a memory for storing said filter parameters for channels from said broadband IF signal of all of said RF receiver units and frequency parameters for all of said tunable down converter units and switch parameters;

an interpreter receiving a selection signal and setting said filter parameters, said tunable down converters, and said switch parameters based on data stored in said memory.

10. The management unit as claimed in claim 9, wherein the interpreter is a Digital Signal Processor (DSP).

11. The multi-protocol receiver as claimed in claim 1, wherein there are at least two of said tunable down converter units in order to receive full duplex conversations.

12. The multi-protocol receiver as claimed in claim 1, wherein a plurality of said RF receiver units, each receives a portion of a single frequency band.

13. The multi-protocol receiver as claimed in claim 1, wherein a single frequency band, larger than one handled by a single one of said RF receiver unit, is handled by a plurality of said RF receiver units.

14. The multi-protocol receiver as claimed in claim 1, wherein each of said RF receiver units handles at least 25 MHz bandwidth signal.

15. A method for receiving a wireless communication with a device which comprises a plurality of RF receiver units, a plurality of tunable down converter units, a plurality of tunable filters, a switch and comprising the steps of:

receiving a request for a specific frequency band and setting a tuning frequency of a selected one of said plurality of tunable down converter units;

setting filter parameters of a selected one of said plurality of tunable filters;

setting said switch in order to couple one of said plurality of RF receiver units to one of said plurality of tunable down converter units;

receiving a wireless signal from an antenna and outputting an IF broadband signal;

down converting the IF broadband signal to provide raw I and Q signals; and filtering the raw I and Q signals to provide filtered I and Q signals.

16. A method as claimed in claim 15 additionally comprising the step of:

digitizing said IF broadband signal by an ADC unit before said switching.

17. A method as claimed in claim 16, wherein the step of switching said switch is directed by a management unit.

18. A method as claimed in claim 15, wherein the step of switching said switch is directed by a management unit.

* * * * *